United States Patent [19]
Rosthauser et al.

[11] Patent Number: 6,020,283
[45] Date of Patent: Feb. 1, 2000

[54] PROCESS FOR THE PRODUCTION OF DELAYED ACTION TIN CATALYSTS

[75] Inventors: James W. Rosthauser, Pittsburgh, Pa.; Hartmut Nefzger, New Martinsville; Robert Lee Cline, Paden City, both of W. Va.

[73] Assignee: Bayer Corporation, Pittsburgh, Pa.

[21] Appl. No.: 09/203,876

[22] Filed: Dec. 2, 1998

[51] Int. Cl.[7] .......................... B01J 31/00; B01J 27/055; B01J 27/135; C08G 18/08; C08G 9/00

[52] U.S. Cl. .......................... 502/152; 502/155; 502/168; 502/218; 502/227; 502/352; 528/58; 521/126

[58] Field of Search ...................... 502/152, 155, 502/168, 218, 227, 352; 528/58; 521/126

[56] References Cited

U.S. PATENT DOCUMENTS

| | | | |
|---|---|---|---|
| 3,523,103 | 8/1970 | Zemlin | 521/126 |
| 3,565,860 | 2/1971 | Pande et al. | 521/126 |
| 3,813,424 | 5/1974 | Hayashi et al. | 260/429.7 |
| 4,087,412 | 5/1978 | Groves | 525/123 |
| 4,549,945 | 10/1985 | Lindstrom | 25/123 |
| 5,145,976 | 9/1992 | Nichols et al. | 556/88 |
| 5,149,844 | 9/1992 | Nichols et al. | 556/89 |
| 5,155,248 | 10/1992 | Ullrich et al. | 556/90 |
| 5,356,529 | 10/1994 | Eswarakrishnan et al. | 205/224 |
| 5,646,195 | 7/1997 | Mobley | 521/121 |
| 5,714,562 | 2/1998 | Rosthauser et al. | 528/58 |
| 5,744,568 | 4/1998 | Kosaka et al. | 528/58 |
| 5,859,165 | 1/1999 | Bossert et al. | 528/58 |

*Primary Examiner*—Mark L. Bell
*Assistant Examiner*—Patricia L. Hailey
*Attorney, Agent, or Firm*—Joseph C. Gil; N. Denise Brown

[57] ABSTRACT

The present invention relates to a novel process for the production of delayed action tin catalysts. This process comprises reacting a dialkyltin dihalide with an alkali metal sulfide, to yield the corresponding 2,2,4,4-tetrakis(alkyl)-1,3,2,4-dithia-stannetane catalyst.

8 Claims, No Drawings

PROCESS FOR THE PRODUCTION OF DELAYED ACTION TIN CATALYSTS

BACKGROUND OF THE INVENTION

This invention relates to a process for the production of delayed action tin catalysts. These delayed action tin catalysts are suitable for catalyzing the reaction between isocyanate groups and isocyanate-reactive groups in a process of making a polyurethane.

Many polyurethane applications use catalysts which are heat activated so that mixtures of the co-reactants have long potlives at room temperature, but react almost immediately when heated to a temperature above the catalyst activation temperature. Current state-of-the-art delayed action catalysts include nickel catalysts, mercury catalysts, bismuth catalysts, and amine catalysts blocked with carboxylic acids. Each of these groups of catalysts has disadvantages associated with their use. Nickel catalysts are used in relatively high levels (i.e. 0.5 to 3.0% by weight, based on the polyol weight). Mercury based catalysts are poisonous and, thus, serious health risks are associated with their use. Catalysts based on bismuth are water sensitive and deactivate in the presence of moisture. Accordingly, these catalysts are not suitable for any application in which water is present or added. The acid-blocked amine catalysts have an unpleasant odor associated with their use. This unpleasant odor remains in the final product, making these catalysts unsuitable for some applications.

Other known delayed action catalysts include various tin-sulfur catalysts such as, for example, tin mercaptoacetates, tin mercaptides and tin sulfides. Of these, the tin mercaptoacetates are known to be sensitive to both acids and to water, which limits their usefulness to application areas which are free from acids and water. The tin mercaptides show some delayed action, but the activation temperature is too low to be of much use commercially. Both the tin mercaptoacetates and the tin mercaptides are more reactive at room temperature than is typically desirable for a delayed action catalyst. Finally, the tin-sulfides have an unpleasant odor associated with their use. The unpleasant odor of these catalysts make these unpopular delayed action catalysts also.

U.S. Pat. No. 3,813,424 discloses a process for the manufacture of dialkyltin oxide. This process comprises alkyl iodide directly with metallic tin to form dialkyltin iodide, followed by hydrolysis to the form the corresponding dialkyltin oxide. Dialkyltin oxides are effective urethane catalysts, but do not have the delayed action feature desired in many applications.

Light stable elastomers and a process for their production are disclosed by U.S. Pat. No. 5,714,562. These elastomers comprise the reaction product of an isocyanate prepolymer, a chain extender and a catalyst selected from i) solid delayed action catalysts having a melting point of greater than about 60° C., ii) alkyl substituted organotin catalysts containing alkylmercaptide ligands which are liquid at room temperature, and iii) alkyl substituted organotin catalysts containing sulfur bridging groups which are liquid at room temperature. Light stable elastomers are based on aliphatic diisocyanates, the reactivity profile of which is quite different from the more widely used aromatic polyisocyanates. Due to the much lower reactivity of aliphatic vs. aromatic isocyanates, it is much easier to make heat activated systems based on aliphatic isocyanates.

Various organotin catalyst compositions are disclosed in U.S. Pat. No. 5,646,195. U.S. Pat. No. 5,646,195 describes delayed action dialkyltin sulfide catalysts that are useful in carpet backing applications. The delay in gellation provides improved handling and backing quality.

SUMMARY OF THE INVENTION

This invention relates to a novel process for the production of delayed action tin catalysts. This process comprises reacting a dialkyltin dihalide with an alkali metal sulfide to form the corresponding 2,2,4,4-tetrakis(alkyl)-1,3,2,4-dithiastannetane catalysts.

The catalysts of the present invention are particularly suited to the processing conditions used to produce carpet and frothed foam carpet cushions, and they can be used in relatively low amounts. They also provide long pot lives (i.e. puddle times) which are necessary to provide a smooth surface when the polyurethane forming compositions are gauged using a doctor bar. They do not lose their catalytic activity in the presence of water. These catalysts provide sufficient catalysis when the compositions are heated in the curing oven. The catalysts of the present invention do not generate objectionable odors, etc., as some prior art catalysts are known to do.

DETAILED DESCRIPTION OF THE INVENTION

The present invention provides a process for the production of catalyst compositions corresponding to the formula:

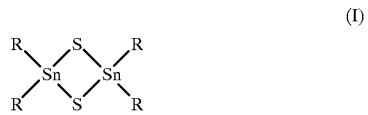
(I)

wherein:
each R: independently represents a linear or branched $C_1$ to $C_{24}$ (preferably from 5 to 16 carbon atoms and most preferably from 8 to 12 carbon atoms) alkyl group, or a cyclic group containing from 3 to 24 carbon atoms (preferably from 5 to 12 carbon atoms and most preferably from 6 to 8 carbon atoms).

This process comprises reacting
(a) at least one compound corresponding to the formula:

(II)

wherein:
each R: independently represent a linear or branched $C_1$ to $C_{24}$ (preferably from 5 to 16 carbon atoms and most preferably from 8 to 12 carbon atoms) alkyl group, or a cyclic group containing from 3 to 24 carbon atoms (preferably from 5 to 12 carbon atoms and most preferably from 6 to 8 carbon atoms); and
X: represents chloride, iodide or bromide;
(b) an alkali metal sulfide (preferably sodium sulfide.);
(c) a polar solvent for component (a), wherein the polar solvent is free of Zerewitinoff active hydrogen atoms; and
(d) a polar solvent for component (b) the alkali metal sulfide, wherein the polar solvent contains Zerewitinoff active hydrogen atoms. Water is a preferred polar solvent containing Zerewitinoff active hydrogen atoms.

The reactants are used in approximately equal molar amounts. The molar ratio of component (a) to component (b) typically ranges from 0.8:1 to 1.1:1, preferably from 0.95:1 to 1.03:1, and most preferably from 0.98:1 to 1.00:1. It is preferred that the reaction is conducted at a temperature between 0 and 100° C., more preferably at a temperature below 60° C., and most preferably at a temperature between 10 and 30° C.

Since both of the reactants are solids, they must each be dissolved completely in polar solvents, and the polar solvents containing the dissolved components (a) and (b) mixed together for the reaction to occur. The minimum quantity of polar solvents (c) and (d) required by the present invention is that amount which is necessary to enable components (a) and (b) to be completely dissolved in polar solvents (c) and (d), respectively.

Some examples of the catalyst compositions which can be produced according to the process of the present invention include, but are not limited to, 2,2,4,4-tetrakis(methyl)-1,3,2,4-dithiadistannetane; 2,2,4,4-tetrakis(ethyl)-1,3,2,4-dithiadi-stannetane; 2,2,4,4-tetrakis(1-propyl)-1,3,2,4-dithiadistannetane; 2,2,4,4-tetrakis(1-butyl)-1,3,2,4-dithiadistannetane; 2,2,4,4-tetrakis(2-butyl)-1,3,2,4-dithiadistannetane; 2,2-bis(1-methyl)4,4-bis(1-butyl)-2,2,4,4-dithiadistannetane; 2,2,4,4-tetrakis(1-pentyl)-1,3,2,4-dithiadistannetane; 2,2,4,4-tetrakis(1-hexyl)-1,3,2,4-dithiadistannetane; 2,2,4,4-tetrakis(2-ethyl-1-hexyl)-1,3,2,4-dithiastannetane; 2,2,4,4-tetrakis(1-heptyl)-1,3,2,4-dithiadistannetane; 2,2,4,4-tetrakis(1-octyl)-1,3,2,4-dithiadistannetane; 2,2,4,4-tetrakis(1-nonyl)-1,3,2,4-dithiadistannetane; 2,2,4,4-tetrakis(1-dodecyl)-1,3,2,4-dithiadistannetane; 2,2,4,4-tetrakis(1-tridecyl)-1,3,2,4-dithiadistannetane; 2,2,4,4-tetrakis(1-tetra-decyl)-1,3,2,4-dithiadistannetane; 2,2,4,4-tetrakis(1-pentadecyl)-1,3,2,4-dithiadistannetane; 2,2,4,4-tetrakis(1-hexadecyl)-1,3,2,4-dithiadistannetane; 2,2,4,4-tetrakis(1-octadecyl)-1,3,2,4-dithiadistannetane; etc.; and mixtures thereof.

In a preferred embodiment of the present invention, the process produces catalyst compositions corresponding to formula (I) above wherein each R independently represents a linear or branched alkyl group having from 5 to 16 carbon atoms, or a cyclic group containing from 5 to 16 carbon atoms. Suitable examples of such catalyst compositions include 2,2,4,4-tetrakis(1-pentyl)-1,3,2,4-dithiadistannetane; 2,2,4,4-tetrakis(1-hexyl)-1,3,2,4-dithiadistannetane; 2,2,4,4-tetrakis(2-ethyl-1-hexyl)-1,3,2,4-dithiastannetane; 2,2,4,4-tetrakis(1-heptyl)-1,3,2,4-dithiadi-stannetane; 2,2,4,4-tetrakis(1-octyl)-1,3,2,4-dithiadistannetane; 2,2,4,4-tetrakis(1-nonyl)-1,3,2,4-dithiadistannetane; 2,2,4,4-tetrakis(1-dodecyl)-1,3,2,4-dithiadi-stannetane; 2,2,4,4-tetrakis(1-tridecyl)-1,3,2,4-dithiadistannetane; 2,2,4,4-tetrakis(1-tetradecyl)-1,3,2,4-dithiadistannetane; 2,2,4,4-tetrakis(1-pentadecyl)-1,3,2,4-dithiadistannetane; 2,2,4,4-tetrakis(1-hexadecyl)-1,3,2,4-dithiadi-stannetane; etc; and mixtures thereof.

In a most preferred embodiment of the present invention, the process produces catalyst compositions corresponding to formula (I) above wherein each R independently represents a linear or branched alkyl group having from 8 to 12 carbon atoms, or a cyclic group having from 6 to 8 carbon atoms. Such catalysts include, for example, 2,2,4,4-tetrakis(1-octyl)-1,3,2,4-dithiadistannetane; 2,2,4,4-tetrakis(1-nonyl)-1,3,2,4-dithiadistannetane; 2,2,4,4-tetrakis(1-decyl)-1,3,2,4-dithiadi-stannetane; 2,2,4,4-tetrakis(1-dodecyl)-1,3,2,4- dithiadistannetane; 2,2,4,4-tetrakis(1-cyclohexyl)-1,3,2,4-dithiadistannetane; and 2,2,4,4-tetrakis(1-cyclooctyl)-1,3,2,4-dithiadistannetane.

Suitable dialkyltin dihalides to used in the process of the present invention include compounds such as, for example, dimethyltin dichloride, dimethyltin diiodide, dimethyltin dibromide, diethyltin dichloride, diethyltin diiodide, diethyltin dibromide, dipropylltin dichloride, dipropyltin diiodide, dipropyltin dibromide, dibutyltin dichloride, dibutyltin diiodide, dibutyltin dibromide, dipentyltin dichloride, dipentyltin diiodide, dipentyltin dibromide, dihexyltin dichloride, dihexyltin diiodide, dihexyltin dibromide, dioctyltin dichloride, dioctyltin diiodide, dioctyltin dibromide, dinonyltin dichloride, dinonyltin diiodide, dinonyltin dibromide, didodecyltin dichloride, didodecyltin diiodide, didodecyltin dibromide, etc. Preferred dialkyltin dihalides include those compounds wherein X represents an iodide atom. Some preferred dialkyltin diiodides include dimethyltin diiodide, diethyltin diiodide, dipropyltin diiodie, dibutyltin diiodide, dipentyltin diiodide, dioctyltin diiodide, dinonyltin diiodide, didodecyltin diiodide, etc.

Suitable alkali metal sulfides for the process of the present invention include compounds such as, for example, lithium sulfide, sodium sulfide, potassium sulfide, magnesium sulfide, calcium sulfide, strontium sulfide, barium sulfide, rubidium sulfide, cesium sulfide, francium sulfide, etc. Cesium sulfide and francium sulfide are much less preferred compounds of this group due to their radioactive nature. Sodium sulfide is particularly preferred for this process.

Suitable polar solvents which are free of Zerewitinoff active hydrogen atoms, i.e. component (c), and which are to be used for dissolving component (a) in accordance with the invention include compounds such as, for example, tetrahydrofuran, dimethyl sulfoxide, dimethyl formamide, N-methylpyrrolidone, dioxane, methylethylketone, diglyme, acetonitrile, acetone, etc. Preferred polar solvents that are free of Zerewitinoff active hydrogen atoms include compounds such as tetrahydrofuran, dioxane, methylethylketone, diglyme, acetonitrile, and most preferably acetone.

Suitable polar solvents containing Zerewitinoff active hydrogen atoms and which are used to dissolve the alkali metal sulfide, i.e. component (b), of the present invention include compounds such as, for example, water, ethanol, isopropanol, etc. and mixtures thereof. It is preferred that water comprises a major portion of the polar solvent containing Zerewitinoff active hydrogen atoms. Water alone as the polar solvent containing Zerewitinoff active hydrogen atoms if particularly preferred.

The process of the present invention in typically carried out in approximately equal molar amounts of dialkyltin dihalides and alkali metal sulfides. It is preferred that the molar ratio of dialkyltin dihalide to alkali metal sulfide is in the range of from 0.8:1 to 1.1:1, preferably from 0.95:1 to 1.03:1, and most preferably from 0.98:1 to 1.00:1. The reaction is, in general, carried out at a temperature of less than 100° C., preferably at a temperature of less than 60° C., and more preferably from about 10 to about 30° C. Atmospheric pressure should be maintained during the reaction, with the reaction being carried out in from 1 to 200 minutes (or possibly longer). The resultant product, i.e. the catalyst compositions of the present invention, can be purified by working up a mixture of 100 g of water per 60 g of resultant product, followed by removal of the organic solvent by a nitrogen stream or under vacuum. The reaction product is washed several times with water and dried in a vacuum oven.

The catalysts of the present invention are suitable for use in a process for the production of polyurethane backing or air frothed foam on a substrate. This process is fully described and claimed in Applicants' copending U.S. application Ser. No. 09/203,875 filed in the United States Patent and Trademark Office on the same day as the present application, the disclosure of which is herein incorporated by reference. This process comprises the steps of a) mixing a polyisocyanate and a polyol blend in the presence of a catalyst to form a reaction mixture, b) applying the reaction mixture to a substrate, and c) curing the reaction mixture to form a polyurethane backing or air frothed foam on the substrate.

The following examples further illustrate details for the process of the preparation of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Example 1

Synthesis of didodecyltin diiodide 50 g. (168.8 mmol) of 1-iodododecane, commercially available from Aldrich, 9.1 g (76.7 mmol) of tin powder, commercially available from Aldrich, and 0.25 g of triethylamine were mixed under nitrogen at room temperature. The suspension was stirred and was slowly heated to 180° C. After 3 hours at 180° C., the mixture was cooled to room temperature. The resultant liquid partially crystallized overnight, forming a white solid having a melting point of approximately 40° C. A small amount of tin powder remained unreacted in the mixture. This mixture was mixed with 60 ml of 6N HCl, and warmed to 55° C. Upon cooling, phase separation occurred. The top layer was discarded, while the bottom layer solidified completely to yield a pale yellow solid. This solid was dried in a desicator for 2 days at room temperature. After drying, 52.8 g (74.3 mmol; 97% of theoretical) of the pale yellow solid was recovered.

Example 2

Synthesis of 2,2,4,4-tetrakis(1-dodecyl)-1,3,2,4-dithiadistannetane using the dialkyltin diiodide from Example 1 as a starting material 52.8 g (74.3 mmol) didodecyltin diiodide was dissolved in 100 ml of acetone. An aqueous solution of 5.98 g (76.7 mmol) sodium sulfide in 50 g. water was added dropwise at room temperature over 15 minutes, to minimize the rise in temperature due to the exotherm. This exothermic reaction mixture was stirred for 2 hours at room temperature, followed by addition of another 100 ml of water, and vaporization of the acetone by a nitrogen stream. The product was isolated by filtration. This process yielded a white solid. This white solid was washed three times with 100 ml. of water, and finally in a Soxhlet apparatus with 100 ml. of acetone. The white solid was determined to be 2,2,4,4-tetrakis(1-dodecyl)-1,3,2,4-dithiadistannetane, and the yield was 25 g. (25.6 mmol; 69%). Elemental analysis of the white solid was as follows:

| | |
|---|---|
| carbon: | 55.7% (calc. 58.9%) |
| hydrogen: | 10.1% (calc. 10.3%) |
| sulfur: | 6.6% (calc. 6.6%) |
| tin: | 24.3% (calc. 24.2%) |

Example 3

Synthesis of 2,2,4,4-tetrakis(1-butyl)-1,3,2,4-dithiadistannetane using dibutyltin dichloride as a starting material The catalyst composition was produced using essentially the same procedure as described in Example 2, except the starting materials were 5.0 g. of dibutyltin dichloride and 1.28 g. of sodium sulfide. This reaction yielded 4.6 g. of purified product.

Example 4

Synthesis of 2,2,4,4-tetrakis(1-octyl)-1,3,2,4-dithiadistannetane using dioctyltin dichloride as a starting material The catalyst composition was produced using essentially the same procedure as described in Example 2, except the starting materials were dioctyltin dichloride and sodium sulfide. This process yielded about 70% of the theoretical amount of product which was determined to be 2,2,4,4-tetrakis(1-octyl)-1,3,2,4-dithiadistannetane.

Elemental anaylsis of the resultant product was as follows:

| | |
|---|---|
| carbon: | 49.3% (calc. 51.0%) |
| hydrogen: | 9.1% (calc. 9.0%) |
| sulfur: | 9.1% (calc. 8.5%) |
| tin: | 29.4% (calc. 31.5%) |

Example 5

Synthesis of 2,2,4,4-tetrakis(1-dodecyl)-1,3,2,4-dithiadistannetane using didodecyltin dichloride as a starting material The catalyst composition was produced using essentially the same procedure as described in Example 2, except the starting materials were dididodecyltin dichloride and sodium sulfide. This process yielded a solid white product, about 70% of theoretical, which was determined to be 2,2,4,4-tetrakis(1-dodecyl)-1,3,2,4-dithiadistannetane.

Elemental analysis of the resultant product was as follows:

| | |
|---|---|
| carbon: | 57.6% (calc. 58.9%) |
| hydrogen: | 10.4% (calc. 10.3%) |
| sulfur: | 7.0% (calc. 6.6%) |
| tin: | 23.2% (calc. 24.2%) |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of catalysts corresponding to the structure

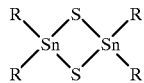
(I)

wherein:

each R: independently represents a linear or branched $C_1$ to $C_{24}$ alkyl group, or a cyclic group containing from 3 to 24 carbon atoms;

comprising reacting:

(a) at least one compound corresponding to the formula:

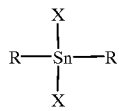
(II)

wherein:

each R: independently represents a linear or branched $C_1$ to $C_{24}$ alkyl group, or a cyclic group containing from 3 to 24 carbon atoms; and X: represents chloride, iodide or bromide; and (b) an alkali metal sulfide; in the presence of:

(c) a polar solvent free of Zerewitinoff active hydrogen atoms for component (a), and (d) a polar solvent containing Zerewitinoff active hydrogen atoms for component (b).

2. The process of claim 1, wherein component (a) corresponds to the formula:

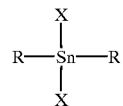
(II)

wherein:

each R: independently represents a linear or branched $C_5$ to $C_{16}$ alkyl group, or a cyclic group containing from 5 to 12 carbon atoms; and X: represents bromide or iodide.

3. The process of claim 2, wherein component (a) corresponds to the formula:

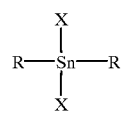
(II)

wherein:

each R: independently represents a linear or branched $C_8$ to $C_{12}$ alkyl group, or a cyclic group containing from 6 to 8 carbon atoms; and X: represents bromide or iodide.

4. The process of claim 1, wherein (b) said alkali metal sulfide comprises sodium sulfide.

5. The process of claim 1, wherein (d) the polar solvent containing Zerewitinoff active hydrogen atoms comprises water.

6. The process of claim 1, wherein (c) the polar solvent free of Zerewitinoff active hydrogen atoms is selected from the group consisting of tetrahydrofuran, dioxane, methylethyl ketone, diglyme, acetonitrile, acetone, and mixtures thereof.

7. The process of claim 1, wherein in structure (I):

each R: independently represents a linear or branched $C_5$ to $C_{16}$ alkyl group, or a cyclic group containing from 5 to 12 carbon atoms.

8. The process of claim 1, wherein in structure (I):

each R: independently represents a linear or branched $C_8$ to $C_{12}$ alkyl group, or a cyclic group containing from 6 to 8 carbon atoms.

* * * * *